3,379,675
POLYETHER URETHANE STABILIZED WITH A
BENZOTRIAZOLE AND A TRIS-PHENOL
Arnold William Jensen and Mara Ozolins, Waynesboro, Va., assignors to E. I. du Pont de Nemours and Company, Wilmington, Del., a corporation of Delaware
No Drawing. Filed July 30, 1964, Ser. No. 386,451
10 Claims. (Cl. 260—45.8)

This invention relates to stabilized shaped articles prepared from polyurethane compositions. More particularly, the invention relates to spandex fibers which are resistant to degradation and loss of physical properties upon exposure to ultraviolet radiation.

Commercial spandex fibers have been developed having improved stability on exposure to ultraviolet light and improved retention of mechanical and elastic properties. Although these fibers are generally satisfactory in filling the needs of the textile industry, the fibers frequently lack adequate stability against yellowing and loss of mechanical properties on exposure to ultraviolet light, especially when it is desired to use them in the lower denier ranges, or in the uncovered state. The known instability to ultraviolet radiation is quite pronounced in the case of polyether-based spandex.

This invention provides stabilized shaped articles of polyether-based polyurethane compositions. In particular, the stabilized compositions of this invention are resistant to degradation and loss of physical properties on exposure to ultraviolet light. Other advantages will be apparent from the following detailed description.

The advantages of this invention are attained by incorporating in spandex fibers a stabilizing amount of (a) a 2-(o-hydroxyphenyl)benzotriazole and (b) 1,3,5-trimethyl-2,4,6-tris(3,5,di-t-butyl-4-hydroxybenzyl)benzene. It is found that the two stabilizers specified, that is, the substituted benzotriazole together with the tris-phenol, produce a synergistic effect, in that the improvement in resistance of the spandex to ultraviolet degradation with the combination of stabilizers is greater than that expected from the simple additive effects of the two types of stabilizers used separately.

The term "spandex fiber" is used in its generic sense herein to mean a manufactured fiber in which at least 85% of the fiber-forming substance is a long-chain, synthetic, segmented polyurethane. It is not intended, however, that the invention be limited to fibers of such segmented polyurethanes since the stabilization is achieved with other shaped articles, such as films and the like. Generally speaking, the segmented polyurethanes to which this invention relates are prepared from hydroxyl-terminated polyethers of low molecular weight. Reaction of the polyether with a molar excess of organic diisocyanate, preferably an aromatic diisocyanate, produces an isocyanate-terminated polymeric intermediate, which may then be chain-extended with a difunctional, active hydrogen-containing compound, such as water, hydrazine, organic diamines, glycols, hydrazides, amino alcohols, etc.

Among the segmented polyurethanes of the spandex type are those described in several patents among which are U.S. Patents 2,929,801, 2,929,802, 2,929,803, 2,929,804, 2,953,839, 2,957,852, 2,999,839, 3,040,003, and 3,071,557. As described in the aforementioned patents, the segmented polyurethane elastomers are comprised of amorphous segments derived from polymers having a melting point below about 50° C. and a molecular weight above about 600, and contain from about 5% to 40% of crystalline segments derived from a polymer having a melting point above about 200° C. in the fiber-forming molecular weight range. Most of such polyurethanes, when in filament form, have an elongation greater than 150%, tensile recovery of over 90%, and a stress decay of less than 20%, as defined in U.S. 2,957,852. The disclosures of the above patents are incorporated herein by reference.

The polyether glycol from which the "soft segment" is derived may contain a single type of linkage, such as in the poly(alkylene oxide) glycols, or it may have more than one type of linkage, as in the polyoxythiaalkylene glycols and in the polyetherester glycols. Even where the linkages are the same, the composition may be a copolymer, such as a copolyether prepared from a mixture of glycols. The polyether glycols may be substituted with halogen, alkyl, and similar groups, which do not interfere with the subsequent polymerization reactions. Representative polyethers which may be used include the poly(alkylene oxide) glycols, such as polyethylene glycol, polypropylene glycol, and polytetramethylene ether glycol, and the polyacetals, such as polydioxolane and polymers from the reaction of formaldehyde with hexamethylene glycol. For the purposes of this invention, the preferred polyether glycols include polytetramethylene ether glycol and glycols of polytetramethylene ether having urethane and/or ester groups in the polymer chain.

Polyesters may be used with the polyethers either as an added component or as an integral part of the polyether molecule, thus forming a polyetherester. Examples of such polyetheresters are poly(diethylene glycol adipate) and poly(triethylene glycol adipate). In general, the term "polyether" as used herein includes mixtures and/or copolymers containing at least 20 mol percent of polyether. Thus, the term includes etherester copolymers from an ether-containing glycol, as noted above, as well as a copolymer prepared from a mixture of an ether-containing glycol and a non-ether-containing glycol such that at least 20% of the non-carbon atoms in the polymer chain are ether-oxygen atoms. Also, the term includes mixtures of polyethers with other suitable soft segments, for example, a mixture of polyether glycol and polyester glycol containing at least 20 mol percent of polyether glycol.

The hydroxy-terminated soft segment is generally reacted with an organic diisocyanate, which may be aliphatic, cycloaliphatic, aromatic, or of mixed type. Suitable organic diisocyanates include p-phenylene diisocyanate, 4,4'-biphenylene diisocyanate, p,p'-methylenediphenyl diisocyanate, p,p'-isopropylidenediphenyl diisocyanate, hexamethylene diisocyanate, and 4,4'-methylenedicyclohexyl diisocyanate. The diisocyanates may contain other substituents, although those which are free from reactive groups other than the two isocyanate groups, are ordinarily preferred. The organic diisocyanate is not critical, and any of those disclosed in the prior art pertaining to spandex may be used.

The difunctional, active hydrogen-containing compounds suitable as chain-extenders include a wide variety of compounds as indicated hereinabove. Organic diamines are preferred. Suitable diamines include ethylenediamine, N,N'-dimethyl-ethylenediamine, tetramethylenediamine, m-xylylenediamine, 1,2-propylenediamine, p-xylylenediamine, cyclohexylenediamine, piperazine, and p,p'-methylenedianiline. Symmetrical aliphatic diamines are preferred.

The phenolic stabilizer useful in the present invention is, as noted above, 1,3,5-trimethyl - 2,4,6-tris(3,5-di-t-butyl-4-hydroxybenzyl)benzene. This compound may be prepared as described in U.S. Patent 3,026,264.

The 2-(o-hydroxyphenyl)benzotriazoles useful in the present invention have a free hydroxyl group on the phenyl radical in the 2-position with respect to the linkage with the triazole ring. The phenyl radical may be further substituted in other positions by lower alkyl, lower alkoxy, carbalkoxy, cyclohexyl, phenyl groups, and halogen. Compounds containing such substituents in the 5-position of the phenyl radical are advantageous. Particularly valuable are the compounds having a free hydroxyl group in the 2-position with respect to the linkage with the triazole ring and being substituted in the 3- and 5- or in the 4- and 5-positions by lower alkyl and chlorine. The fused benzene ring of the benzotriazole may also be substituted by inert substituents, such as lower alkyl groups and halogen.

The benzotriazole stabilizers may be prepared by the methods described in U.S. Patent 3,004,896. In general, all of the hydroxyphenylbenzotriazoles within the claims of U.S. 3,004,896 are suitable for use in the present invention. These include, for example, 2-(2'-hydroxy-5'-methylphenyl)-benzotriazole, 2-(2'-hydroxy - 5'-t-butylphenyl)-5-chlorobenzotriazole, and 2-(2'-hydroxy-3',5'-dimethylphenyl)benzotriazole.

In the stabilized shaped articles of this invention each of the stabilizing components should be used in the correct amount. The amount of each may vary within a wide range, with amounts from a fraction of 1%, e.g. 0.1%, to about 5% or even 10% or more by weight of each stabilizer, based upon the segmented polyurethane, being effective. The optimum quantity for a particular fiber will vary and for reasons of economy should, of course, be kept as low as possible. The selection of the optimum quantity will depend on a number of factors, such as the particular type of spandex fiber, the fiber geometry, and porosity. Preferably, amounts from about 0.3% to about 1.5% by weight of each stabilizer are utilized.

It is important, in order that the advantages of this invention may be realized, to use sufficient amounts of the benzotriazole in relation to the amount of the trisphenol. Generally, a ratio of benzotriazole:trisphenol exceeding 1:1 by weight is not necessary. When the stabilizers are used in the lower part of the concentration range, i.e., at concentrations of less than about 0.5%, the benzotriazole:trisphenol ratio should approach 1:1. At the higher concentrations of the stabilizers, a lesser ratio of benzotriazole:trisphenol may be used. For spandex fibers, the preferred concentrations of the stabilizers are 1% of the trisphenol and 0.5% of the benzotriazole by weight based on the polyurethane.

Although the stabilizers may be incorporated in the shaped article by various procedures, preferably they are dissolved in a solution of the segmented polyurethane prior to shaping. In this method, the polyurethane should be substantially free of unreacted isocyanate groups. The solution may then be cast into a film in the conventional way. Solutions of the spandex polymer containing the stabilizers may also be spun into fibers by the usual extrusion techniques, e.g., dry spinning.

Other methods for incorporating the stabilizers are similar to those used for incorporating dyestuffs. For example, the stabilizers may be dissolved in a suitable solvent to which the fibers are inert, i.e., non-reactive, and the fibers immersed in the treating solution. Or the stabilizers may be dispersed in a liquid medium and applied to the fiber by passing it through a treating bath containing the dispersed stabilizers. Alternatively, the stabilizers of this invention may be incorporated in the spin finish and applied to the fiber immediately after extrusion.

The spandex fibers may be treated alone or may be incorporated in fabrics with fibers of different compositions. While the treatment of fabrics containing other fibers as well as spandex fibers requires more of the treating agents, the other fibers are not adversely affected. Both natural and synthetic fibers, as well as blends thereof, may be included in the fabrics without impairing the stabilization of the spandex fibers. However, the preferred method of stabilizing the spandex is to incorporate the stabilizers in the spinning solution before extrusion.

This invention is also applicable to shaped articles other than fibers and films prepared, e.g., by molding, from segmented polyurethanes as hereinbefore defined. Additives, fillers, plasticizers, pigments, and the like, which are conventionally used with segmented polyurethanes, may be used as desired with the stabilizers of this invention.

The principal advantage attained by the present invention resides in providing spandex fibers which are resistant to discoloration and loss of physical properties on exposure to ultraviolet light. In addition to the ultraviolet stability, further advantages are the protection of the stabilized fibers against the loss of physical properties under conditions of high temperature as well as resistance to yellowing caused by acid fumes or a smog atmosphere. The tendency to discolor under such conditions is particularly pronounced in the case of polyether-based spandex containing in the polymer chain recurring aromatic ureylene residues, i.e., radicals of the formula —Ar—NH—CO—NX— wherein X represents hydrogen or a monovalent organic radical such as methyl, ethyl or phenyl, and Ar represents an aromatic radical attached to the adjacent N of the formula through a carbon atom of an aromatic ring.

This invention will be further illustrated, but is not intended to be limited, by the following examples in which parts and percentages are by weight unless otherwise specified.

In Examples I to III the test for ultraviolet stability is performed by wrapping samples of the continuous-filament spandex on cards and exposing the samples to the rays of a xenon arc for the time indicated. The light source is an "Osram" 6-kw., high pressure, quartz-shielded, water-cooled, AC lamp, purchased from Macbeth Corporation of Newburgh, N.Y. The temperature of exposure averages 65° C.

Example I

Polytetramethylene ether glycol of molecular weight about 2000 and p,p'-methylenediphenyl diisocyanate are intimately mixed in the ratio of 2 mols of diisocyanate per mol of polyether glycol and are reacted to yield an isocyanate-terminated polyether. The isocyanate-terminated polyether, cooled to about 50° C., is conducted at a rate of 132 parts per hour into a mixer, and a stream of N,N-dimethylacetamide is added at 162 parts per hour. The mixture (45% solids) is discharged continuously into a pipeline and conducted to a second mixer, in which it is intimately mixed with a stream of 86.7 parts of dimethylacetamide, 6.9 parts of m-xylylenediamine and 0.5 part of diethylamine, added at a total rate of 94 parts per hour. The residence time is 3-4 minutes, and the temperature rises from about 40° C. to 90° C. The emerging polymer solution contains approximately 36% solids and has a viscosity of about 2500 poises at 40° C. The polymer has an inherent viscosity of 1.1, measured at 25° C. in hexamethylphosphoramide at a concentration of 0.5 gram per 100 ml. of solution.

The viscous polymer solution is divided into several portions. To each portion are added the ingredients as indicated below. The concentrations in the table are based on the polymer solids.

|  | A | B | C |
| --- | --- | --- | --- |
| 1,3,5-trimethyl-2,4,6-tris-(3,5-di-t-butyl-4-hydroxy-benzyl)benzene (percent) | 1 |  | 1 |
| 2-(2'-hydroxy-3'-t-butyl-5'-methyl-phenyl)5-chloro-benzotriazole (percent) |  | 0.5 | 0.5 |

The solutions are dry-spun in the usual way to produce spandex filaments. The filament samples are exposed to ultraviolet light for a period of 60 hours. The tenacity of the filaments before and after exposure is measured. The following results are obtained:

| Sample | Denier | Tenacity Before Exposure (g.p.d.) | Tenacity After Exposure (g.p.d.) | Percent Tenacity Retained, percent |
|---|---|---|---|---|
| A | 448 | 0.735 | 0.074 | 10.1 |
| B | 435 | 0.655 | 0.085 | 13.0 |
| C | 436 | 0.680 | 0.565 | 83.1 |

A sample containing no additives was completely degraded (no tenacity retained) on exposure to ultraviolet light for 40 hours. From the retained tenacity values for Samples A and B, a theoretical retained tenacity of 23.1% would be deduced for Sample C. The actual value of 83.1% demonstrates the synergism of the stabilizer combination.

Example II

To another portion of the viscous polymer solution described in the first paragraph of Example I is added a slurry containing 30% by weight of titanium dioxide dispersed in dimethylacetamide such that the mixture contains 5% of the titanium dioxide based on the polymer solids. The above mixture is then divided into several portions.

To each portion are added the ingredients as indicated below, the concentrations being based on the polymer solids.

| | A | B | C | D |
|---|---|---|---|---|
| 1,3,5-trimethyl-2,4,6-tris(3,5-di-t-butyl-4-hydroxybenzyl)benzene (percent) | 1 | | 1 | |
| 2-(2'-hydroxy-3'-t-butyl-5'-methyl-phenyl)5-chloro-benzotriazole (percent) | | 0.5 | 0.5 | |

The solutions are dry spun in the usual way to produce spandex filaments. The filament samples are tested for ultraviolet stability by exposure for a period of 80 hours. The tenacity of the filaments before and after exposure is measured. The following results are obtained:

| Sample | Denier | Tenacity Before Exposure (g.p.d.) | Tenacity After Exposure (g.p.d.) | Percent Tenacity Retained, percent |
|---|---|---|---|---|
| A | 431 | 0.53 | 0.095 | 17.9 |
| B | 438 | 0.50 | 0.33 | 6.6 |
| C | 416 | 0.54 | 0.623 | >100 |
| D | 431 | 0.56 | 0.34 | 6.1 |

Again the data demonstrate the synergism of the stabilizer combination.

Example III

To other portions of the mixture of spandex polymer and dispersed titanium dioxide described in the first paragraph of Example II are added the ingredients as indicated below.

| | A | B | C | D |
|---|---|---|---|---|
| 1,3,5-trimethyl-2,4,6-tris(3,5-di-t-butyl-4-hydroxybenzyl)benzene (percent) | 1 | | 1 | |
| 2-(2'-hydroxy-5-methyl-phenyl)-benzotriazole (percent) | | 0.5 | 0.5 | |

The solutions are dry spun in the usual way to produce spandex filaments which are exposed to ultraviolet light for 60 hours. The tenacity of the filaments before and after exposure is measured. The following results are obtained:

| Sample | Denier | Tenacity Before Exposure (g.p.d.) | Tenacity After Exposure (g.p.d.) | Percent Tenacity Retained, percent |
|---|---|---|---|---|
| A | 431 | 0.53 | 0.298 | 56.2 |
| B | 431 | 0.48 | 0.04 | 8.3 |
| C | 391 | 0.50 | 0.50 | 100.0 |
| D | 431 | 0.56 | 0.04 | 7.1 |

The data demonstrate the synergism of this stabilizer combination.

What is claimed is:

1. A polyether-based spandex fiber stabilized against ultraviolet light degradation by having incorporated therein a stabilizing quantity of (a) a 2-(o-hydroxyphenyl)-benzotriazole and (b) 1,3,5-trimethyl-2,4,6-tris(3,5-di-t-butyl-4-hydroxybenzyl)benzene.

2. The fiber of claim 1 wherein (a) and (b) are each present in an amount up to about 10% by weight of said fiber.

3. An ultraviolet light stabilized polyether-based spandex fiber containing from about 0.1% to about 5% by weight each of (a) a 2-(o-hydroxyphenyl)-benzotriazole and (b) 1,3,5 - trimethyl - 2,4,6-tris(3,5-di-t-butyl-4-hydroxybenzyl)benzene.

4. A shaped article of a long chain synthetic elastomer comprised of at least 85% of a segmented polyether-based polyurethane stabilized against ultraviolet light degradation by the presence therein of a stabilizing quantity of (a) a 2-(o-hydroxyphenyl)benzotriazole and (b) 1,3,5-trimethyl - 2,4,6-tris(3,5-di-t-butyl-4-hydroxybenzyl)benzene.

5. The shaped article of claim 4 wherein (a) and (b) are each present in an amount from about 0.1% to about 5% by weight of said shaped article.

6. The shaped article of claim 5 wherein said polyurethane is prepared by chain extending an isocyanate-terminated polymeric intermediate with m-xylylene-diamine.

7. The shaped article of claim 6 wherein (a) and (b) are each present in an amount from about 0.3% to about 1.5% by weight of said shaped article.

8. The shaped article of claim 4 wherein (a) is 2-(2'-hydroxy-5'-methylphenyl)-benzotriazole.

9. The shaped article of claim 4 wherein (a) is 2-(2'-hydroxy-5'-t-butylphenyl)-5-chlorobenzotriazole.

10. The shaped article of claim 4 wherein (a) is 2-(2'-hydroxy-3',5'-dimethylphenyl)-benzotriazole.

References Cited
UNITED STATES PATENTS

| 2,915,496 | 12/1959 | Swart et al. | 260—45.95 |
| 3,062,895 | 11/1962 | Martin et al. | 260—45.95 |
| 3,206,431 | 9/1965 | Doyle et al. | 260—45.95 |
| 3,239,474 | 3/1966 | Cwik | 260—45.8 |
| 3,271,337 | 9/1966 | Goddu | 260—45.95 |
| 3,271,339 | 9/1966 | Cappuccio et al. | 260—45.8 |

DONALD E. CZAJA, *Primary Examiner.*

H. E. TAYLOR, *Assistant Examiner.*